United States Patent
Zhang et al.

(10) Patent No.: US 11,250,080 B2
(45) Date of Patent: Feb. 15, 2022

(54) METHOD, APPARATUS, STORAGE MEDIUM AND ELECTRONIC DEVICE FOR ESTABLISHING QUESTION AND ANSWER SYSTEM

(71) Applicant: ALIBABA GROUP HOLDING LIMITED, Grand Cayman (KY)

(72) Inventors: Qiang Zhang, Hangzhou (CN); Changdong Han, Hangzhou (CN); Xiaojun Wang, Hangzhou (CN); Chuan Qin, Hangzhou (CN); Hanyang Zeng, Hangzhou (CN)

(73) Assignee: ALIBABA GROUP HOLDING LIMITED, George Town (KY)

(*) Notice: Subject to any disclaimer, the term of this patent is extended or adjusted under 35 U.S.C. 154(b) by 152 days.

(21) Appl. No.: 16/456,341

(22) Filed: Jun. 28, 2019

(65) Prior Publication Data

US 2020/0004795 A1    Jan. 2, 2020

(30) Foreign Application Priority Data

Jun. 29, 2018    (CN) .......................... 201810712179.1

(51) Int. Cl.
*G06F 16/953*    (2019.01)
*G06F 16/951*    (2019.01)

(52) U.S. Cl.
CPC .......... *G06F 16/953* (2019.01); *G06F 16/951* (2019.01)

(58) Field of Classification Search
CPC .............................. G06F 16/953; G06F 16/951
USPC ........................................................ 707/741
See application file for complete search history.

(56) References Cited

U.S. PATENT DOCUMENTS

| | | | |
|---|---|---|---|
| 5,519,608 | A | 5/1996 | Kupiec |
| 5,978,784 | A | 11/1999 | Fagg, III et al. |
| 6,028,601 | A | 2/2000 | Machiraju et al. |
| 6,315,572 | B1 | 11/2001 | Owens et al. |
| 6,584,470 | B2 | 6/2003 | Veale |
| 7,349,899 | B2 | 3/2008 | Namba |
| 8,332,394 | B2 | 12/2012 | Fan et al. |
| 8,412,514 | B1 | 4/2013 | Feng et al. |
| 8,666,730 | B2 | 3/2014 | Todhunter et al. |

(Continued)

FOREIGN PATENT DOCUMENTS

| | | |
|---|---|---|
| CN | 104216913 B | 1/2019 |
| JP | 4654745 B2 | 3/2011 |
| KR | 101173561 B1 | 8/2012 |

OTHER PUBLICATIONS

Written Opinion of the International Searching Authority and International Search Report for PCT Application No. PCT/US2019/039767 dated Sep. 9, 2019 (8 pages).

(Continued)

*Primary Examiner* — Mark E Hershley

(57) ABSTRACT

Methods, systems, and devices, including computer programs encoded on computer storage media, for establishing a question and answer (QA) system are provided. One of the methods includes: determining QA pair data according to an extraction template and a target data source; adjusting the extraction template according to anomaly information corresponding to the QA pair data; updating the QA pair data according to the target data source and the adjusted extraction template; and determining a QA index according to the updated QA pair data to establish a QA system.

20 Claims, 8 Drawing Sheets

(56) References Cited

U.S. PATENT DOCUMENTS

| | | | |
|---|---|---|---|
| 9,092,802 B1* | 7/2015 | Akella | G06Q 30/0256 |
| 9,244,894 B1* | 1/2016 | Dale | G06F 40/279 |
| 9,582,757 B1* | 2/2017 | Holmes | G06N 3/006 |
| 10,009,375 B1* | 6/2018 | Sites | G06F 21/552 |
| 10,318,529 B2 | 6/2019 | Brown et al. | |
| 2003/0177192 A1 | 9/2003 | Umeki et al. | |
| 2006/0229896 A1 | 10/2006 | Rosen et al. | |
| 2006/0235689 A1 | 10/2006 | Sugihara et al. | |
| 2008/0031447 A1* | 2/2008 | Geshwind | H04L 9/3226 380/46 |
| 2008/0070223 A1* | 3/2008 | Lofkrantz | G06Q 10/00 434/350 |
| 2009/0094053 A1* | 4/2009 | Jung | G06Q 10/00 705/2 |
| 2009/0288150 A1* | 11/2009 | Toomim | G06F 21/6218 726/5 |
| 2011/0125726 A1 | 5/2011 | Neagovici-negoescu et al. | |
| 2011/0125734 A1 | 5/2011 | Duboue et al. | |
| 2011/0296391 A1 | 12/2011 | Gass et al. | |
| 2011/0307435 A1* | 12/2011 | Overell | G06N 20/00 706/46 |
| 2012/0101807 A1 | 4/2012 | Heo et al. | |
| 2013/0132091 A1* | 5/2013 | Skerpac | G06F 21/32 704/273 |
| 2013/0191723 A1* | 7/2013 | Pappas | G06F 40/143 715/234 |
| 2013/0226942 A1* | 8/2013 | Denoual | G06F 16/438 707/754 |
| 2013/0311875 A1* | 11/2013 | Pappas | G06F 40/143 715/234 |
| 2014/0280087 A1 | 9/2014 | Isensee et al. | |
| 2014/0358890 A1* | 12/2014 | Chen | G06F 16/3329 707/710 |
| 2015/0178853 A1* | 6/2015 | Byron | G06Q 40/12 705/30 |
| 2015/0186515 A1* | 7/2015 | Rao | G06F 16/951 707/610 |
| 2015/0186527 A1 | 7/2015 | Rao et al. | |
| 2015/0186528 A1* | 7/2015 | Rao | G06F 16/9535 707/710 |
| 2016/0034457 A1* | 2/2016 | Bradley | G06F 16/24522 707/749 |
| 2016/0140090 A1* | 5/2016 | Dale | G06F 40/284 715/205 |
| 2016/0180242 A1* | 6/2016 | Byron | G06N 5/041 706/11 |
| 2017/0032689 A1* | 2/2017 | Beason | G06F 40/30 |
| 2017/0046624 A1* | 2/2017 | Murdock, IV | G09B 7/02 |
| 2017/0220964 A1* | 8/2017 | Datta Ray | H04L 63/20 |
| 2017/0243116 A1* | 8/2017 | Takagi | G06F 16/2455 |
| 2018/0011838 A1* | 1/2018 | Beller | G06F 40/186 |
| 2018/0081871 A1* | 3/2018 | Williams | G06F 16/31 |
| 2018/0241881 A1* | 8/2018 | Li | H04M 3/5183 |
| 2018/0358001 A1* | 12/2018 | Amid | G06N 20/00 |

OTHER PUBLICATIONS

PCT International Preliminary Report on Patentability dated Apr. 7, 2020, issued in related International Application No. PCT/US2019/039767 (9 pages).

\* cited by examiner

| Project Management | Seed Management | Template Management | Feedback | QA Service |

Project Management > Project Inquiry

Project Inquiry
New Project

Project Name: [Inquiry project name]　　Creator: [Inquiry creator]

| Project ID ⇕ | Project Name ⇕ | Result output path | Creator ⇕ | Reviser ⇕ | Creation Time ⇕ |
|---|---|---|---|---|---|
| *** | **** | ***** | ***** | ***** | ***** |
| *** | **** | ***** | ***** | ***** | ***** |
| *** | **** | ***** | ***** | ***** | ***** |
| *** | **** | ***** | ***** | ***** | ***** |

Figure 2

METHOD, APPARATUS, STORAGE MEDIUM AND ELECTRONIC DEVICE FOR ESTABLISHING QUESTION AND ANSWER SYSTEM

CROSS-REFERENCE TO RELATED APPLICATIONS

This application claims priority to the Chinese patent application No. 201810712179.1 filed on Jun. 29, 2018, and entitled "Method, apparatus, storage medium and electronic device for establishing question and answer system", which is incorporated herein by reference in its entirety.

TECHNICAL FIELD

The present specification relates to the technical field of data processing, and, in particular, to a method, an apparatus, a storage medium and an electronic device for establishing a question and answer system.

BACKGROUND

A question and answer (QA) system, as an advanced form of information retrieval system, can accurately answer questions raised by users so that the users can quickly and accurately obtain the required information. It is research content with broad development prospects in the field of artificial intelligence.

However, most of the current QA systems are established manually, for example, by manually running a crawler program, running an indexing program, etc., which results in low efficiency in the process of establishing a search engine and greater likelihood of mistakes due to human errors, etc., thus making the establishment of a QA system time-consuming and less efficient.

SUMMARY

The objective of the present specification is to provide a method, an apparatus, a storage medium and an electronic device for establishing a QA system to increase efficiency in the establishment of the QA system.

In one aspect, the present specification provides a method for establishing a QA system. The method may include: determining QA pair data according to an extraction template and a target data source; adjusting the extraction template according to anomaly information corresponding to the QA pair data; updating the QA pair data according to the target data source and the adjusted extraction template; and determining a QA index according to the updated QA pair data to establish a QA system.

In another aspect, the present specification provides an apparatus for establishing a QA system. The apparatus may include: a first program unit configured to determine a QA pair data according to an extraction template and a target data source; a second program unit configured to adjust the extraction template according to anomaly information corresponding to the QA pair data to update the QA pair data; and a third program unit configured to determine a QA index according to the updated QA pair data to establish a QA system.

In yet another aspect, the present specification provides a non-transitory computer-readable storage medium for establishing a QA system. The storage medium may store instructions executable by one or more processors causing the one or more processors to perform operations. The operations may include: determining QA pair data according to an extraction template and a target data source; adjusting the extraction template according to anomaly information corresponding to the QA pair data; updating the QA pair data according to the target data source and the adjusted extraction template; and determining a QA index according to the updated QA pair data to establish a QA system.

In still another aspect, the present specification provides an electronic device for establishing a QA system. The electronic device may include one or more processors and one or more non-transitory computer-readable memories coupled to the one or more processors. The memories may be configured with instructions executable by the one or more processors to cause the system to perform operations. The operations may include: determining QA pair data according to an extraction template and a target data source; adjusting the extraction template according to anomaly information corresponding to the QA pair data; updating the QA pair data according to the target data source and the adjusted extraction template; and determining a QA index according to the updated QA pair data to establish a QA system.

A solution for establishing a QA system provided by the embodiments of the present specification may include: determining QA pair data according to an extraction template and a target data source; adjusting the extraction template according to anomaly information corresponding to the QA pair data; updating the QA pair data according to the target data source and the adjusted extraction template; and determining a QA index according to the updated QA pair data to establish a QA system. With this solution, a desired QA system may be established according to the determined extraction template and target data source, and the efficiency in establishing the QA system may be improved.

BRIEF DESCRIPTION OF THE DRAWINGS

To more clearly describe the technical solutions of embodiments of the present specification, the accompanying drawings to be used in the embodiments will be briefly described. The accompanying drawings merely illustrate some embodiments of the present specification, and therefore, should not be deemed as a limitation to the scope. One of ordinary skill in the art may obtain other related drawings according to the accompanying drawings without inventive effort.

FIG. 2 is a schematic diagram of a user-oriented management interface according to the embodiments of the present specification.

DETAILED DESCRIPTION

The embodiments of the present specification will be described in detail below with reference to accompanying drawings and embodiments, so that the specification of the technical means to solve the technical problems and achieve the technical effects can be fully understood and implemented.

In the following embodiments, an example where the target data source is used as a target web page group is described to illustrate the establishment of a QA system. In other embodiments of the present specification, the target data source may also be another data source, for example, a text document, a multimedia file, etc., which will not be limited in the present specification.

Figure 1:
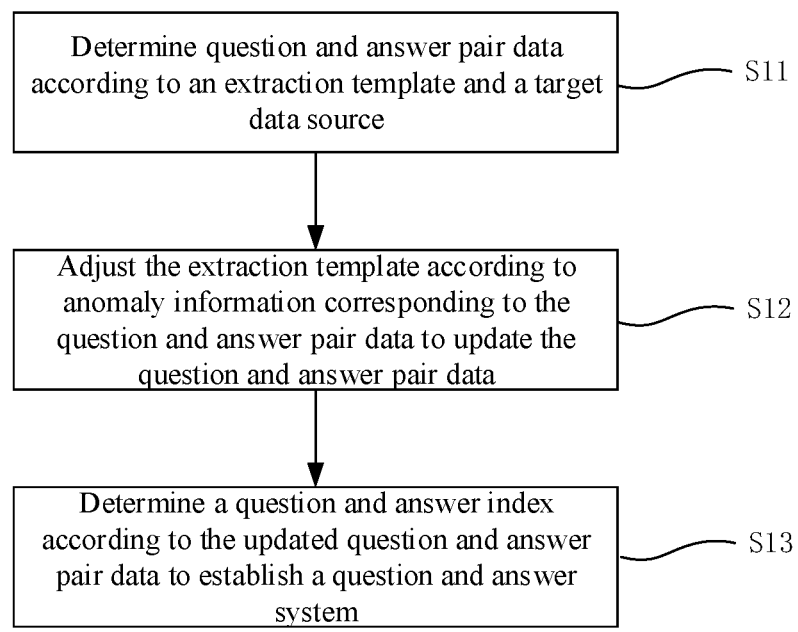
FIG. 1 is a schematic flowchart of a method for establishing a QA system according to Embodiment 1 of the present specification.

FIG. 1 is a schematic flowchart of a method for establishing a QA system according to Embodiment 1 of the present specification. In one embodiment, a file storage platform used may be a distributed storage platform Smdb, a file storage system used may be a distributed file system Pangu, an indexing engine used may be a search engine HA3, and a computing platform used may be a streaming computing platform Sm stream. In other embodiments, other file systems or search engines may also be used, which will not be limited in this specification.

As shown in FIG. 1, the method for establishing a QA system includes the following steps.

In step S11, QA pair data is determined according to an extraction template and a target data source.

Various types of data in the target data source can be the basic data used in the process of establishing a QA system, the extraction template is a template used to extract data from the target data source, and the data extracted from the target data source may be directly used as QA pair data.

In some embodiments, the target data source and the extraction template may be determined by request data. For example, an input interface is configured on a backend server to receive the request data input by a user.

In one embodiment, the server may provide the user with a management interface, and the user may establish a project through the management interface and then input specific establishment request data under the project. A target web page group and an extraction template may be included in the establishment request data. In this embodiment, explanation is given by using an example where the target data source is used as a target web page group.

The management interface provided to the user by the server may be as shown in FIG. 2, where such functions as project management, seed management, template management, failure feedback, and a QA service may be achieved through the management interface provided by the server. The project management is used to manage a project established by the user; the seed management is used to manage a target web page group input by the user; the template management is used to manage an extraction template input by the user; the failure feedback is used to feed back a web page corresponding to the QA pair data having an anomaly in the process of establishing a search engine (see the following embodiments for details of failure feedback); and the QA service is used to provide a QA service to the user according to an established QA system.

The user may input the target web page group through the management page. To input the target web page group, the input content may be a web page address (e.g., URL) of a website homepage, and the web pages included in the target web page group may be the web pages obtained by clicking a preset number of times on the basis of the inputted homepage. For example, after the web page address of the homepage is inputted, the target web page group may be three web pages obtained by three clicks on the basis of the homepage. In other embodiments, the target web page group input may also be a group of web page addresses, and the input manner of the target web page group is not limited in this specification.

In one embodiment, the extraction template may be an XPath template. XPath is an XML path language, which may be used to determine nodes in an XML file and then read the data of a selected node. For example, the XPath template may include multiple groups of data, and each group of data include data of two nodes. The data of the two nodes are respectively used for indicating a node in which a question is located and a node in which an answer is located.

In another embodiment, after the target web page group is determined, the web page data of one or more web pages in the target web page group may be crawled by a crawler. Then the QA pair data in the web pages may be extracted according to the extraction template, and the determined QA pair data may be stored in a storage system of the server.

In yet another embodiment, when the extraction template is an XPath template, nodes in web pages may be located according to the XPath template, and then data at the located nodes in the web pages can be extracted and output as the QA pair data.

See Embodiment 2 described below for the method for extracting data according to the extraction template, which is not described here.

In step S12, the extraction template is adjusted according to anomaly information corresponding to the QA pair data to update the QA pair data.

In one embodiment, if the extraction template is not applicable to some of the web pages in the target web page group, the QA pair data corresponding to these web pages may have an anomaly, and then anomaly information corresponding to the QA pair data having an anomaly may be determined.

In another embodiment, the QA pair data having an anomaly among the QA pair data may first be determined, subsequently the anomaly information is determined according to the QA pair data having an anomaly, and then the extraction template is adjusted according to the anomaly information to update the QA pair data.

By adjusting the extraction template according to the anomaly information and then re-extracting data in the target data source to update the QA pair data, the accuracy and integrity of the determined QA pair data may be ensured.

In yet another embodiment, an incremental or a full-quantity mode may be used to update the QA pair data. For example, when re-extracting data, only the web pages corresponding to the QA pair data having an anomaly may be extracted, that is, an incremental mode is performed to update the QA pair data. However, in order to reduce missing data in the already successfully extracted web pages, all of the web pages in the target web page group may be re-extracted again, that is, a full-quantity mode is performed to update the QA pair data. See embodiments described below for the specific method for determining QA pair data, and it will not be described here.

After re-extracting, the determined QA pair data may be used as newly added data to update the obtained QA pair data.

See Embodiment 3 for the embodiment of Step S12, and it will not be described here.

In step S13, a QA index is determined according to the updated QA pair data to establish a QA system.

In some embodiments, step S12 may be performed multiple times until the QA pair data having an anomaly meet a preset condition; and then step S13 can be performed.

In other embodiments, the preset condition is used to indicate whether the QA pair data may be used to determine a QA index. The preset condition may be the quantity of QA pair data having an anomaly or the percentage of QA pair data having an anomaly in the total QA pair data, etc. When the QA pair data meet the preset condition, there are few anomalies in the extraction process, or the accuracy of the QA pair data is relatively high. In this case, the QA index may be determined according to the QA pair data.

In the QA pair data extraction, the data in the target web page group may be changing with the usage of the Internet. After an initial completion of the QA pair data extraction (e.g., the extraction of the determined one or more web pages in the target web page group is completed, the extraction time reaches a set time, or the quantity of the extracted data reaches a threshold), the QA index may be determined according to the already determined QA pair data. Based on the determined QA index, the establishment of a QA system may be accomplished, and then the QA service may be provided.

Figure 3:
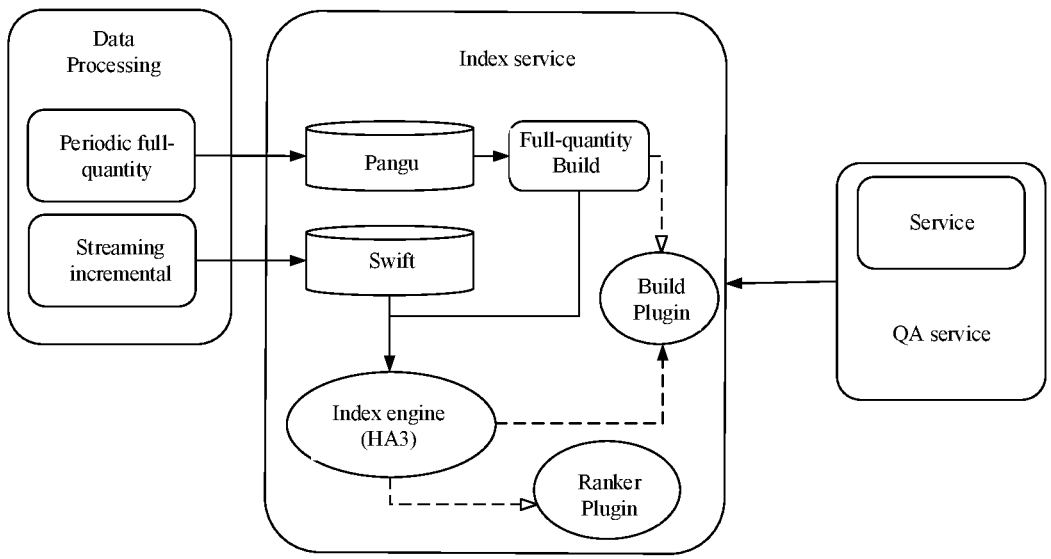
FIG. 3 is a schematic diagram of determining a QA index according to the embodiments of the present specification.

In one embodiment, as shown in FIG. 3, when determining the QA index, the data may be processed in a periodic full-quantity mode or a streaming incremental mode, and the QA pair data may then be added to a QA index engine through the periodic full-quantity mode or the streaming incremental mode, thereby determining the QA index.

In another embodiment, in the mode, the data added to the index engine is the data stored in the Pangu database. By reading the data in the Pangu database on a periodic basis and processing the data by a Build plugin, data in an index format is output to an HA3 index engine so as to add the stored QA pair data to the QA index in the periodic full-quantity mode.

In yet another embodiment, when the QA pair data is added to the QA index in the periodic full-quantity mode, the reading time of the QA pair data in the Pangu database may be a preset time, e.g., performing once per day, or it may also be performed manually by the user, which will not be described here.

In still another embodiment, in the streaming incremental mode, the data added to the index engine is information obtained by a message system Swift. For example, when there are updates or additions in web pages in the target web page group, an increment message may be sent to the index engine after the data in the modified or added web pages is extracted according to the extraction template. After the message system Swift receives the increment message, the QA pair data corresponding to the increment message may be processed through the Build plugin, then data in an index format is output to the HA3 index engine, thereby adding the added QA pair data to the QA index in the streaming incremental mode.

In some embodiments, after the QA indexing is completed through the HA3 index engine, a QA service or search service may be provided according to the determined QA index. The user may input a question through the "Service" of the QA service on the interface in FIG. 2, and after the user has inputted the question, the QA service may perform text analysis on the question inputted by the user and then determine an answer that matches the question in the search engine according to the analysis results, and then return the answer to the user.

In other embodiments, after the user has inputted the question, the QA service in FIG. 3 may perform a text analysis on the user's question, for example, performing text segmentation on the question, and then determine corresponding answers in an index service according to the text analysis results through the QA index. The answers are then roughly ranked by the Ranker plugin in FIG. 3 and returned to the QA service, thus returning the answers to the user to provide the QA service to the user.

In one embodiment, the established QA system may be a vertical QA system, and it may also be another QA system, which is not limited by this embodiment.

A solution for establishing a QA system provided by the embodiments of the present specification may include: determining a QA pair data according to an extraction template and a target data source; adjusting the extraction template according to anomaly information corresponding to the QA pair data to update the QA pair data; and determining a QA index according to the updated QA pair data to establish a QA system. Through the solution for establishing a QA system provided by the embodiments of the present specification, the required QA system may be established according to the determined extraction template and target data source, and the efficiency in establishing a QA system may be improved.

Embodiment 2

Figure 4:
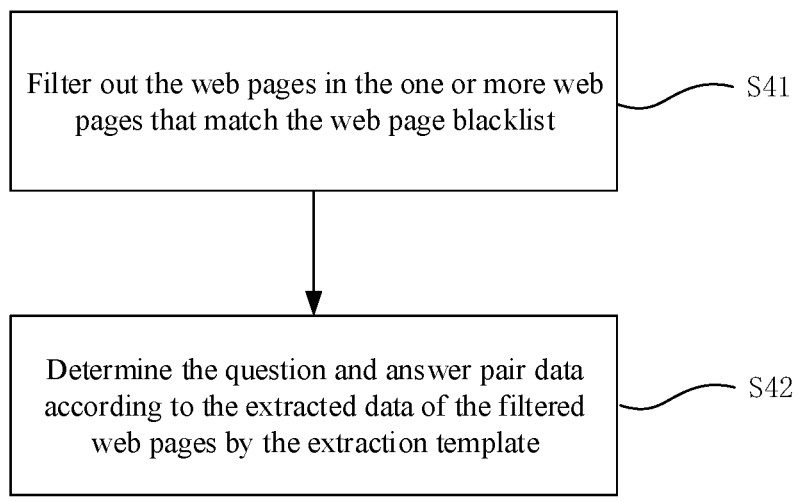
FIG. 4 is a flowchart of a method for extracting data in web pages according to Embodiment 2 of the present specification.

FIG. 4 is a flowchart of a method for extracting data in web pages according to Embodiment 2 of the present specification. As shown in FIG. 4, the method comprises the following steps.

In step S41, web pages matching a web page blacklist are filtered out of the one or more web pages.

In one embodiment, the web page blacklist which is provided by the user is included in the establishment request data and is used to represent web pages corresponding to QA pairs not required or considered by the user. The web page blacklist may be URLs of a group of web pages, or a web page vector used to represent a web page, which is not limited by this specification.

In another embodiment, after a html file of web pages is crawled by a crawler, it may be temporarily stored in a buffer as web page htmls to be extracted. The buffer may include a processing queue, and each web page may correspond to a processing task in the processing queue, so that data of one or more web pages can be extracted according to the processing task sequence in the processing queue.

When each web page corresponds to one processing task in the processing queue, each web page may be processed one by one according to the processing task sequence. When processing a web page, whether the web page is on the web page blacklist may be determined by determining whether the web page matches the web page blacklist. If the web page is on the blacklist, then the web page is filtered out, and if the web page is not on the blacklist, then step S42 may be performed.

In an actual implementation, the content in a website may change with a user's activity on the Internet. In some embodiments, when crawling a web, the web pages in a provided target web page group may be crawled periodically (e.g., every hour, every 10 minutes, etc.) to determine whether there are updates for existing web pages in the target web page group, and to determine whether there are newly added web pages in the target web page group. Thereby, the updated or newly added web pages in the target web page group can be supplemented to ensure the integrity of the data of the target web page group.

At the same time, there is no temporal relationship between the step of crawling web pages and the step of filtering web pages, and the two are only related through the buffer. In some embodiments, the crawled web page data may be placed directly in the buffer as the web pages to be extracted.

In step S42, the QA pair data are determined according to the extracted data of the filtered web pages in the target web page group, and the extracted data is obtained by the extraction template.

For example, when the extraction template is an XPath extraction template, the XPath extraction template is used to define the nodes where the QA pair data is located in the web page, the data corresponding to the nodes may then be determined, and the QA pair data corresponding to the web page is thus obtained. For instance, when a target web page group includes a comment title and answers under the title, the title and the first answer under the title may be considered as a QA pair. The title may be considered as a question in the QA pair, and the first answer may be considered as an answer in the QA pair.

In one embodiment, after the data of each web page is extracted, the obtained QA pair data may include one or more groups of QA pairs, which is not limited in this specification.

In another embodiment, the extraction template may also be an extraction template in another format, which is not limited in this specification.

Figure 5:
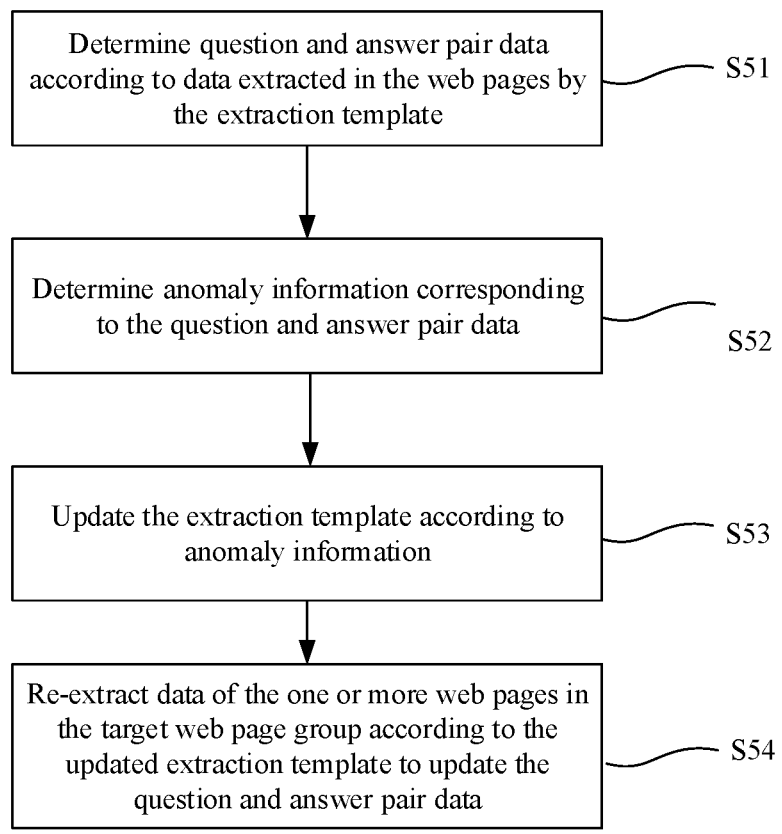
FIG. 5 is a flowchart of a method for adjusting an extraction template and updating the QA pair data according to Embodiment 3 of the present specification.

FIG. 5 is a flowchart of a method for adjusting an extraction template and updating the QA pair data according to Embodiment 3 of the present specification. As shown in FIG. 5, the method may include the following steps.

In step S51, the QA pair data is determined according to the data extracted by the extraction template from web pages.

See the embodiment described above for the details of the method for extracting data in a web page, which is not described here.

If the data is extracted successfully, then the determined QA pair data can be directly output. In one embodiment, the output QA pair data may be stored, for example, through the distributed file system Pangu. In another embodiment, the output QA pair data may be stored by another storage or managed directly through another file system, which is not limited in this specification.

If there is an anomaly, then the following step S52 can be performed.

For example, when extracting data from the web pages, some web pages may have different node distribution from other web pages, resulting in empty QA pair data or other an anomaly for these web pages.

In some embodiments, to determine whether there is an anomaly, the extracted QA pair data may be analyzed through the streaming computing platform Sm stream. If the determined QA pair data does not match a preset condition, then the process of determining the QA pair data by extracting data from the web pages can be determined as a failure. The preset condition may include a threshold of storage space occupied by the QA pair data, and/or a difference between the number of questions and the number of answers in the QA pair data.

For example, if the QA pair data determined by extracting a certain web page occupies very little storage space, indicating that the content of the QA pair data is empty, that is, the condition for the storage space occupied by the QA pair data does not meet the preset condition. In another example, the preset condition includes that the number of questions and the number of answers should be the same in the QA pair data determined according to the same web page. In other words, after extracting a certain web page, if the number of questions and the number of answers in the determined QA pair data corresponding to the same web page are not the same, the condition for the number of questions and the number of answers in the QA pair data does not meet the preset condition. Conversely, if the determined QA pair data matches the preset condition, then the process of extracting QA pairs from the web page is successful.

In step S52, anomaly information corresponding to the QA pair data is determined.

In one embodiment, when performing the failure feedback, web pages corresponding to the QA pair data with an anomaly are determined as anomaly information. The anomaly information may also be displayed through a display interface corresponding to the "failure feedback" in FIG. 2. In another embodiment, the anomaly information may also include other content, which is not limited in this specification.

At the same time, web pages corresponding to the QA pair data with an anomaly may also be stored through the distributed file system Pangu.

In step S53, the extraction template is adjusted according to the anomaly information.

In some embodiments, the anomaly information may include a source of the QA pair data having an anomaly, i.e., information of a web page (e.g., the URL of a web page). The extraction template may be adjusted according to the node distribution of the web page having an anomaly to further improve the extraction template.

In one embodiment, step S53 can be performed after performing steps S51 and S52 multiple times to determine multiple web pages corresponding to QA pair data with an anomaly. In another embodiment, the step S53 can be performed each time after a web page corresponding to the QA pair data having an anomaly is determined through steps S51 and S52.

In some other embodiments, when the extraction template is an XPath extraction template, the adjusting the extraction template may include adjusting, deleting or adding nodes in the XPath extraction template representing QAs.

In step S54, re-extracting data of the web pages in a target web page group according to the adjusted extraction template to update the QA pair data.

When re-extracting web page data of web pages in the target web page group, the data re-extraction may be performed only on web pages having an anomaly; or on all web pages in the target web page group.

In one embodiment, when extracting the web pages corresponding to the QA pair data having an anomaly, the web pages corresponding to the QA pair data having an anomaly may be retrieved in the buffer through the distributed file system Pangu. Processing tasks corresponding to these web pages are generated in a processing queue of the buffer, so that the web pages corresponding to the QA pair data having an anomaly can be re-extracted.

In another embodiment, after the extraction template is adjusted, in order to ensure the accuracy of the determined QA pair data, the already successfully extracted web pages may also be re-extracted in the same way. Similarly, the already successfully extracted web pages may be retrieved to the buffer through the distributed file system Pangu, and the corresponding processing tasks can be generated.

In yet another embodiment, the QA pair data determined according the adjusted extraction template may be added as an increment to the already determined QA pair data, and the QA pair data having an anomaly may also be removed to update the QA pair data.

Steps S52, S53 and S54 described above may be performed one or more times in the process of data extraction. When re-extracting, the web pages having an anomaly can be re-extracted until the number of web pages corresponding to the QA pair data having an anomaly is relatively small or zero (i.e., ensuring that the QA pair data having an anomaly in the determined QA pair data meet the preset condition), and then the data in all the web pages of the target web page group is re-extracted. In some embodiments, the step S53 may be performed to adjust the extraction template after all the web pages in the target web page group have been extracted, and then Step S54 is performed; and this is not limited in this specification.

Figure 6:
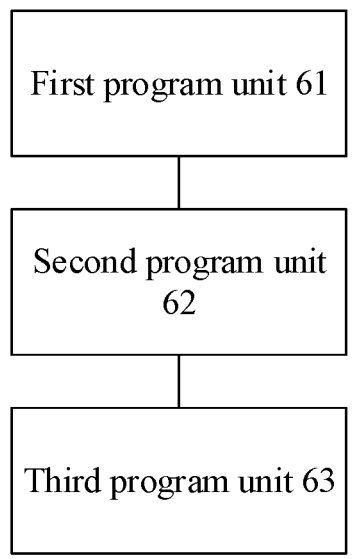
FIG. 6 is a schematic structural diagram of an apparatus for establishing a QA system according to Embodiment 4 of the present specification.

FIG. 6 is a schematic structural diagram of an apparatus for establishing a QA system according to Embodiment 4 of the present specification. As shown in FIG. 6, the apparatus includes: a first program unit 61, a second program unit 62, and a third program unit 63. The first program unit 61 is configured to determine QA pair data according to an extraction template and a target data source; the second program unit 62 is configured to adjust the extraction template according to anomaly information corresponding to the QA pair data to update the QA pair data; and the third program unit 63 is configured to determine a QA index according to the updated QA pair data to establish a QA system.

Figure 7:
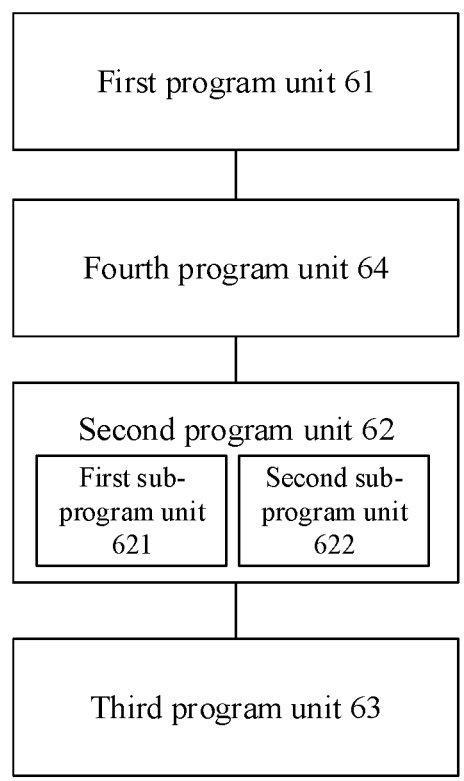
FIG. 7 is a schematic diagram of a hardware structure of some electronic devices for performing the methods for establishing a QA system according to the present specification.

In one embodiment, as shown in FIG. 7, the apparatus for establishing a QA system further includes: a fourth program unit 64, configured to determine the QA pair data having an anomaly according to a preset condition.

In another embodiment, as shown in FIG. 7, the second program unit 62 includes: a first sub-program unit 621 and a second sub-program unit 622. The first sub-program unit 621 is configured to adjust the extraction template according to the anomaly information of the QA pair data; and the second sub-program unit 622 is configured to update the QA pair data according to the target data source and the adjusted extraction template.

In yet another embodiment, the third program unit 63 is configured to determine the QA index in an incremental or a periodic full-quantity mode according to the updated QA pair data to establish a QA system.

Figure 8:
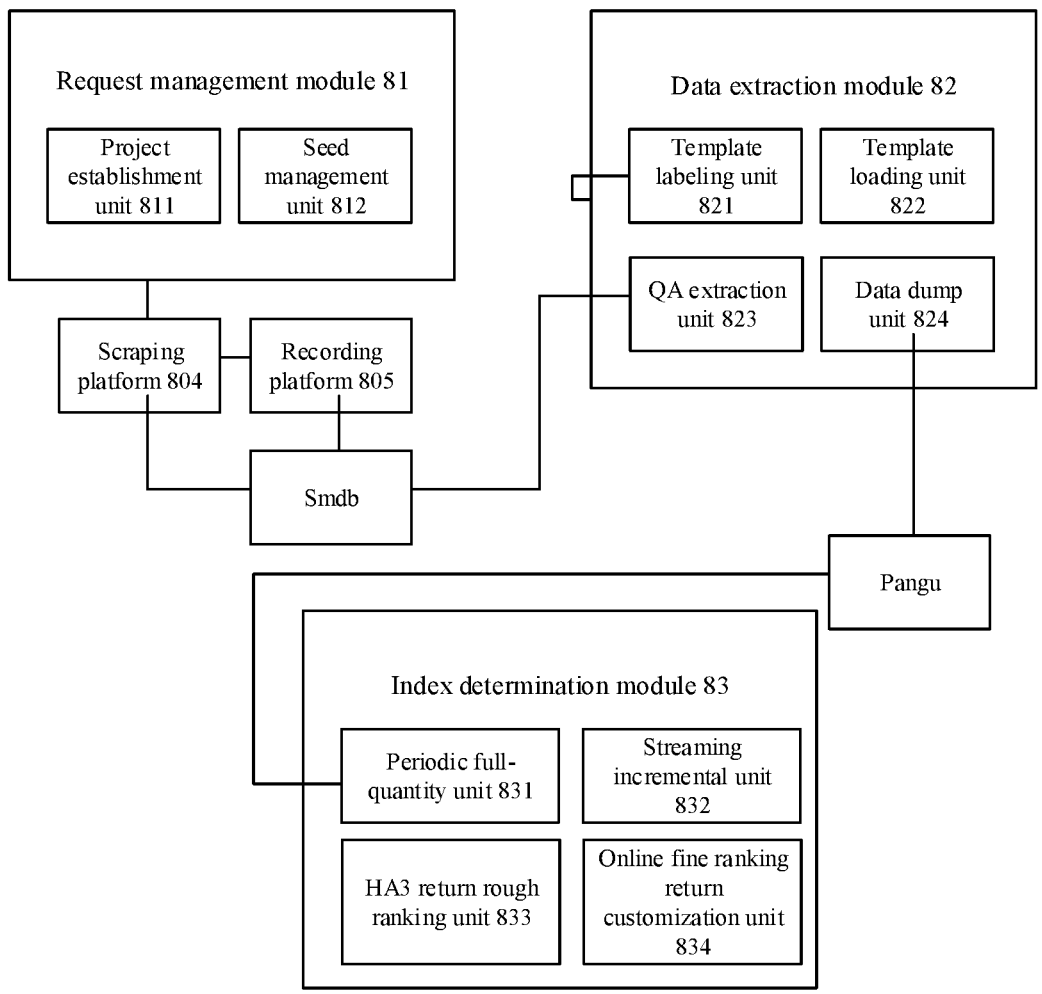
FIG. 8 is a schematic structural diagram of an apparatus for establishing a QA system according to Embodiment 5 of the present specification.

FIG. 8 is a schematic structural diagram of an apparatus for establishing a QA system according to Embodiment 5 of the present specification. As shown in FIG. 8, this schematic structural diagram of an apparatus for establishing a QA system is used to illustrate an actual usage scenario. The apparatus comprises: a request management module 81, a data extraction module 82, and an index determination module 83.

In some embodiments, the request management module 81 is configured to determine a target data source and an extraction template according to request data. In other embodiments, the request management module may not be included, and the target data source and the extraction template may be determined in other ways, for example, by receiving messages from other processors or servers and determining the target data source and the extraction template.

In some embodiments, the request management module 81 may provide request management for the user in the establishment of a QA system, such as project management, web page management, template management. For example, a management interface provided to the user by the request management module 81 is shown in FIG. 2.

In other embodiments, the request management module 81 may include a project establishment unit 811 and a seed management unit 812. The request management module 81 may perform data interaction between a scraping platform 804 and a recording platform 805. The scraping platform 804 may include a scraping submission unit, and the recording platform 805 may include a data management unit. The project establishment unit 811 is configured to determine a project that the user uses to establish a QA system, so as to establish the QA system under the project established by the user. The seed management unit 812 is configured to provide the user with a management function for the target data source (e.g., providing a target data source management function to the user through the seed management in FIG. 2). The scraping submission unit is configured to scrape the one or more web pages of the target web page group and submit the scraping result to the data management unit; and the data management unit is configured to add a tag corresponding to the project for the scraped web pages so that the recording platform includes the web pages for data extraction.

In some other embodiments, the user may establish one or more projects through the request management module 81. If multiple projects are established, then corresponding relationships between such request data as the target web page group and the extraction template should be established. For example, the data management is configured to add tags corresponding to the projects for the scraped web pages after the web pages in the target web page group are crawled, thereby establishing a relationship between the web pages and the projects. In some embodiments, if the same target web page group corresponds to multiple projects, then multiple tags corresponding to the multiple projects may be added to the same target web page group.

Establishing relationships between other request data and projects is similar to what is described above, which is not described here.

In one embodiment, the data extraction module 82 is configured to determine the QA data pair data according to an extraction template and a target data source; and is also configured to adjust the extraction template according to anomaly information corresponding to the QA pair data to update the QA pair data. In another embodiment, the data extraction module 82 may be reused as the first program unit 61 or the second program unit 62. In yet another embodiment, the first program unit 61 and second program unit 62 may also be separated and implemented through different modules, which is not limited in this specification.

The data extraction module 82 may extract data from a web page based on a streaming computing platform Sm stream, and the data extraction module 82 comprises a template labeling unit 821, a template loading unit 822, a QA extraction unit 823, and a data dump unit 824. The template labeling unit 821 is configured to label the web page content according to the extraction template, for example, labeling data of node in the web page as the QA pair data. The template loading unit 822 is configured to load a labeled template after the labelling, the QA extraction unit 823 is configured to extract data in a web page according to the loaded labeled template and determine the QA pair data, and the data dump unit 824 is configured to download the QA pair data determined after the extraction.

In some embodiments, the scraped web pages may be stored in a distributed storage platform Smdb, and the QA extraction unit 843 in the data extraction module 82 may obtain the scraped web pages from the distributed storage platform Smdb, and extract data in the web pages according to the template loaded by template loading unit 821 to determine the QA pair data. If the extraction by the QA extraction unit 823 is successful, then the extracted data is downloaded by the data dump unit 824. If there is an anomaly in the QA pair data determined after the extraction by the QA extraction unit 821, the extraction template may be adjusted according to the web pages corresponding to the QA pair data having an anomaly and re-downloaded through the template loading unit 822, so that data may be extracted according to the adjusted extraction template. The specific embodiment is described above, which is not described here again.

In some other embodiments, the index determination module 83 is configured to determine a QA index according to the updated QA pair data and determine a QA system according to the QA index.

In one embodiment, the index determination module 83 comprises a periodic full-quantity unit 831, a streaming incremental unit 832, an HA3 return rough ranking unit 833, and an online fine ranking return customization unit 834. The periodic full-quantity unit 831 is configured to add the QA pair data to the QA index in a periodic full-quantity mode, the streaming incremental unit 832 is configured to add the QA pair data to the QA index in an incremental mode, the HA3 return rough ranking unit 833 is configured to perform a rough ranking on the returned results corresponding to the question input by the user, and the online fine ranking return customization unit 834 is configured to perform a fine ranking on the rough ranking results.

In another embodiment, the QA pair data determined by the data extraction module 82 may be stored in the distributed file system Pangu, and the periodic full-quantity unit 831 of the index determination module 83 may obtain the full-quantity QA pair data from the distributed file system Pangu to add the QA pair data to the QA index in the periodic full-quantity mode. After the data extraction module 82 extracts the QA pair data, the data may also be sent to the streaming incremental unit 832 in the form of increment messages in order to add the QA pair data to the QA index in the streaming incremental mode. In yet another embodiment, to facilitate a search, the QA index may be an inverted index.

A QA system is determined according to the QA index to provide the user with a QA service. After the user inputs a question, data corresponding to the answers to be returned is determined through the index. The determined returned results may be roughly ranked through the HA3 return rough ranking unit 833, and then the roughly ranked results may be finely ranked through the online fine ranking return customization unit 834. Then the obtained returned results corresponding to the question can be sent to the user in order to provide the user with the answers corresponding to the question.

The present specification further provides a storage medium which stores computer executable instructions, and the following method is performed when the computer executable instructions are executed by a processor. The method may include: determining QA pair data according to an extraction template and a target data source; adjusting the extraction template according to anomaly information corresponding to the QA pair data to update the QA pair data; and determining a QA index according to the updated QA pair data to establish a QA system.

The present specification further provides an electronic device, and the device may include: one or more processors; and a memory storing one or more programs. When the one or more programs is executed by the one or more processors, the one or more processors are enabled to implement the methods described above.

Figure 9:
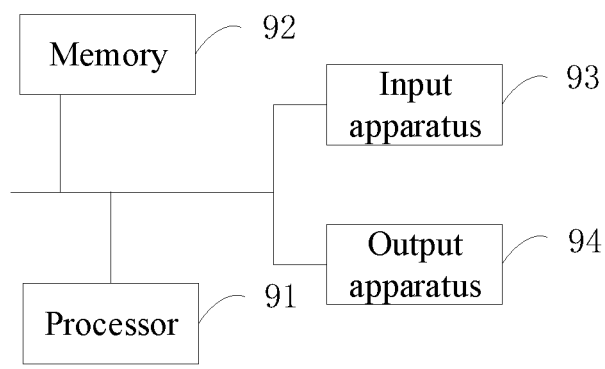
FIG. 9 is a schematic diagram of another hardware structure of an electronic device for performing the methods for establishing a QA system according to the present specification.

FIG. 9 is a schematic diagram of a hardware structure of some electronic devices according to the present specification for executing the methods described above. As shown by FIG. 9, the device may include: one or more processors 91 and a memory 92. An example where one processor 91 is configured as is illustrated in FIG. 9.

The device for performing a method for establishing a QA system may further include: an input apparatus 93 and an output apparatus 94.

The processor 91, the memory 92, the input apparatus 93 and the output apparatus 94 may be connected through a bus or in other ways, and the example illustrated in FIG. 9 is a bus connection.

The memory 92, as a non-transitory computer readable storage medium, may be configured to store non-volatile software programs, and non-volatile computer executable programs and modules, such as the program instructions/modules corresponding to the method for establishing a QA system in the embodiments of the present specification. By running the non-volatile software programs, instructions and modules stored in the memory 92, the processor 91 thereby performs various functional specifications and data processing of the server, thus performing the method for establishing a QA system in the embodiments of the method described above.

The memory 92 may comprise a program storage area and a data storage area, wherein, the program storage area may store an operating system and specification programs required for at least one function; the data storage area may store data established during the establishment of the QA system. In addition, the memory 92 may include a high speed-random access memory 92, and it may also include a non-volatile memory 92, such as at least one magnetic disk storage device 92, flash memory device, or another non-volatile solid state memory devices 92. In some embodiments, the memory 92 optionally includes memories 92 remotely arranged relative to the processor 91, and these remote memories 92 may be connected to a client terminal through a network. The examples of the network described above include but are not limited to the Internet, an intranet, a local area network, a mobile communication network and combinations thereof.

The input apparatus 93 may receive input digital or character information and generate key signal input related to user settings and function control at the client terminal. The input apparatus 93 may include devices such as a pressing module.

The one or more modules are stored in the memory 92, and when performed by the one or more processors 91, the one or more modules perform the method for establishing a QA system in any of the method embodiments described above.

The product described above may perform the methods provided in the embodiments of the present specification and has function modules and beneficial effects corresponding to the embodiment of the methods. For technical details not described in this embodiment, reference may be made to the methods provided by the embodiments of the present specification.

The electronic devices in the embodiments of the present specification exist in multiple forms, including but not limited to:

(1) Mobile communication devices: This type of devices is characterized by having a mobile communication function with the objectives of providing voice and data communication. This type of terminal includes smart phones (e.g., iPhone), multimedia mobile phones, functional mobile phones, and low-end mobile phones, etc.

(2) Ultra-mobile personal computer devices: This type of devices belongs to the personal computer category. It may have computing and processing functions, and generally also has the feature of mobile Internet. This type of terminal includes PDAs, MIDs and UMPC devices, etc., such as iPad.

(3) Portable entertainment devices: This type of devices can display and broadcast multimedia content. This type of devices includes audio/video players (e.g., iPod), handheld gaming devices, electronic books, and smart toys and portable car navigation devices.

(4) Servers: devices providing computing services, server configurations include a processor 91, a hard disk, a memory, system bus, etc.; the servers are similar to general-purpose computers in terms of architecture, and may have higher requirements for the processing capacity, stability, reliability, safety, expandability, manageability and the like as they are able to provide highly reliable services.

(5) Other electronic apparatuses with data interaction functionality.

The apparatus embodiments described above are merely schematic, wherein the modules described as separate components may or may not be physically separated, and the components shown as modules may or may not be physical modules, that is, they may be positioned in one place, or they may be distributed to multiple network modules. Some or all the modules may be selected according to actual need so as to realize the objectives of the solution disclosed in the embodiment. It may be understood and implemented by persons of ordinary skill in the art without creative effort.

From the above description of embodiments, those skilled in the art may clearly know that the various embodiments may be achieved by virtue of the combination of software and a necessary general-purpose hardware platform, and of course, may also be achieved by hardware. With this understanding, the technical solutions described above, may, in essence, or for the part contributing to the prior art, be embodied in the form of a software product, and the computer software product may be stored in computer readable storage media. The computer readable storage media include any mechanism used for storing and transmitting information in a computer (e.g., computer) readable form. For example, a machine readable medium includes a read only memory (ROM), a random access memory (RAM), a disk storage medium, an optical storage medium, a flash storage medium, electronic, optical, sound or other forms of propagating signals (such as carrier waves, infrared signals, and digital signals), etc., and the computer software product includes a certain number of instructions for enabling a computer device (which may be a personal computer, a server, or a network device, etc.) to perform the methods described in various embodiments or in portions of the embodiments.

Those skilled in the art should understand that the embodiments of the present specification may be provided as methods, apparatuses (devices), or computer program products. Therefore, the embodiments of the present specification may take the form of an entirely hardware embodiment, an entirely software embodiment, or an embodiment combining software and hardware. Moreover, the embodiments of the present specification may take the form of a computer program product implemented on one or more computer usable storage media (including but not limited to disk storage, CD-ROM, optical memory units, etc.) that comprise computer usable program codes.

The embodiments of the present specification are described with reference to the flowcharts and/or block diagrams of the methods, apparatuses (devices) and computer program products according to the embodiments of the present specification. It should be understood that each process and/or block in the flowcharts and/or block diagrams as well as combinations of the processes and/or blocks in the flowcharts and/or box diagrams may be implemented by computer program instructions. These computer program instructions may be provided to processors of general-purpose computers, special-purpose computers, embedded processors or other programmable data processing devices to establish one machine such that instructions are performed by the processors of the computers or other programmable data processing devices to generate an apparatus for implementing the functions specified in one or more processes in the flowcharts and/or one or more blocks in the block diagrams.

These computer program instructions may also be stored in a computer readable memory device that can guide the computer or other programmable data processing devices to work in a specific way, causing instructions stored in the computer readable memory device to produce an article of manufacture that includes an instruction means which performs functions specified in one or more processes in the flowcharts and/or one or more blocks in the block diagrams.

These computer program instructions may also be loaded onto a computer or other programmable data processing devices to enable execution of a series of operation steps on the computer or other programmable devices to bring about computer-implemented processing. As a result, instructions performed on the computer or other programmable devices provide steps for implementing the functions specified in one or more processes in the flowcharts and/or one or more blocks in the block diagrams.

It should finally be noted that the above embodiments are only used for illustrating rather than limiting the technical solutions of the embodiments of the present specification. Although detailed descriptions of the present specification are made by referencing the embodiments described above, persons of ordinary skill in the art should understand that modifications may be made to the technical solutions disclosed in the foregoing embodiments or equivalent substitutions may be made to part of technical features thereof; and these modifications or substitutions should not cause the nature of the corresponding technical solutions to depart from the spirit and scope of the technical solutions of the embodiments of the present specification.

The invention claimed is:

1. A method for establishing a question and answer (QA) system, comprising:
   determining QA pair data according to a target data source and an extraction template comprising an XPath extraction template, wherein the determining comprises:

extracting data located in nodes of a web page in the target data source as the QA pair data;

analyzing the QA pair data through streaming computing to determine that the QA pair data have an anomaly; and determining anomaly information according to the QA pair data determined to have the anomaly;

adjusting the extraction template according to the anomaly information corresponding to the QA pair data;

re-extracting data in the web page with the adjusted extraction template;

updating the QA pair data according to the re-extracted data, the target data source and the adjusted extraction template;

determining whether the updated QA pair data meets a preset condition, the preset condition comprising a quantity of QA pair data that have an anomaly or a percentage of QA pair data having an anomaly in a total extracted QA pair data; and in response to the updated QA pair data meets the preset condition, determining a QA index according to the updated QA pair data to establish a QA system.

2. The method according to claim 1, wherein the target data source includes a target web page group comprising one or more web pages.

3. The method according to claim 2, wherein analyzing the QA pair data through streaming computing to determine that the QA pair data have an anomaly comprises:

when a second preset condition corresponding to the QA pair data is not met, determining that the QA pair data have an anomaly.

4. The method according to claim 3, wherein the second preset condition includes at least one of: a condition that a number of questions and a number of answers are the same in QA pair data corresponding to a same web page; and a threshold of storage space occupied by the QA pair data.

5. The method according to claim 2, wherein the determining QA pair data according to a target data source and an extraction template comprising an XPath extraction template comprises:

matching the one or more web pages with a web page blacklist;

filtering out the matched web pages to obtain a filtered target web page group; and determining the QA pair data according to the extraction template and the filtered target web page group.

6. The method according to claim 2, wherein determining the QA index according to the updated QA pair data to establish the QA system comprises:

determining the QA index in a streaming incremental mode according to the updated QA pair data to establish the QA system.

7. The method according to claim 2, wherein determining the QA index according to the updated QA pair data to establish the QA system comprises:

determining the QA index in a periodic full-quantity mode according to the updated QA pair data to establish the QA system.

8. The method according to claim 1, wherein the XPath template comprises data of two nodes for locating a node of a question and a node of an answer in the web page.

9. An electronic device for establishing a question and answer (QA) system, comprising one or more processors and one or more non-transitory computer-readable memories coupled to the one or more processors and configured with instructions executable by the one or more processors to cause the system to perform operations comprising:

determining QA pair data according to a target data source and an extraction template comprising an XPath extraction template, wherein the determining comprises:

extracting data located in nodes of a web page in the target data source as the QA pair data;

analyzing the QA pair data through streaming computing to determine that the QA pair data have an anomaly; and determining anomaly information according to the QA pair data determined to have the anomaly;

adjusting the extraction template according to the anomaly information corresponding to the QA pair data;

re-extracting data in the web page with the adjusted extraction template;

updating the QA pair data according to the re-extracted data, the target data source and the adjusted extraction template;

determining whether the updated QA pair data meets a preset condition, the preset condition comprising a quantity of QA pair data that have an anomaly or a percentage of QA pair data having an anomaly in a total extracted QA pair data; and in response to the updated QA pair data meets the preset condition, determining a QA index according to the updated QA pair data to establish a QA system.

10. The electronic device according to claim 9, wherein the target data source includes a target web page group comprising one or more web pages.

11. The electronic device according to claim 10, wherein analyzing the QA pair data through streaming computing to determine that the QA pair data have an anomaly comprises:

when a second preset condition corresponding to the QA pair data is not met, determining that the QA pair data have an anomaly.

12. The electronic device according to claim 11, wherein the second preset condition includes at least one of: a condition that a number of questions and a number of answers are the same in QA pair data corresponding to a same web page; and a threshold of storage space occupied by the QA pair data.

13. The electronic device according to claim 10, wherein the determining QA pair data according to a target data source and an extraction template comprising an XPath extraction template comprises:

matching the one or more web pages with a web page blacklist;

filtering out the matched web pages to obtain a filtered target web page group; and determining the QA pair data according to the extraction template and the filtered target web page group.

14. The electronic device according to claim 10, wherein determining the QA index according to the updated QA pair data to establish the QA system comprises:

determining the QA index in a streaming incremental mode according to the updated QA pair data to establish the QA system.

15. The electronic device according to claim 10, wherein determining the QA index according to the updated QA pair data to establish the QA system comprises:

determining the QA index in a periodic full-quantity mode according to the updated QA pair data to establish the QA system.

16. The electronic device according to claim 9, wherein the XPath template comprises data of two nodes for locating a node of a question and a node of an answer in the web page.

17. A non-transitory computer-readable storage medium for establishing a question and answer (QA) system, storing instructions executable by one or more processors causing the one or more processors to perform operations comprising:
- determining QA pair data according to a target data source and an extraction template comprising an XPath extraction template, wherein the determining comprises:
  - extracting data located in nodes of a web page in the target data source as the QA pair data;
  - analyzing the QA pair data through streaming computing to determine that the QA pair data have an anomaly; and
  - determining anomaly information according to the QA pair data determined to have the anomaly;
- adjusting the extraction template according to anomaly information corresponding to the QA pair data;
- re-extracting data in the web page with the adjusted extraction template;
- updating the QA pair data according to the re-extracted data, the target data source and the adjusted extraction template;
- determining whether the updated QA pair data meets a preset condition, the preset condition comprising a quantity of QA pair data that have an anomaly or a percentage of QA pair data having an anomaly in a total extracted QA pair data; and
- in response to the updated QA pair data meets the preset condition, determining a QA index according to the updated QA pair data to establish a QA system.

18. The non-transitory computer-readable storage medium to claim 17, wherein the target data source includes a target web page group comprising one or more web pages, and analyzing the QA pair data through streaming computing to determine that the QA pair data have an anomaly comprises:
- when a second preset condition corresponding to the QA pair data is not met, determining that the QA pair data have an anomaly.

19. The non-transitory computer-readable storage medium according to claim 18, wherein the second preset condition includes at least one of: a condition that a number of questions and a number of answers are the same in QA pair data corresponding to a same web page; and a threshold of storage space occupied by the QA pair data.

20. The non-transitory computer-readable storage medium according to claim 18, wherein the determining QA pair data according to a target data source and an extraction template comprising an XPath extraction template comprises:
- matching the one or more web pages with a web page blacklist;
- filtering out the matched web pages to obtain a filtered target web page group; and
- determining the QA pair data according to the extraction template and the filtered target web page group.

* * * * *